P. J. WENTWORTH.
MOLDING MACHINE.
APPLICATION FILED APR. 24, 1917.

1,288,776.

Patented Dec. 24, 1918.
2 SHEETS—SHEET 1.

INVENTOR-
Pearl J. Wentworth
By his Attorney
Nelson Westover

P. J. WENTWORTH.
MOLDING MACHINE.
APPLICATION FILED APR. 24, 1917.

1,288,776.

Patented Dec. 24, 1918.
2 SHEETS—SHEET 2.

INVENTOR-
Pearl J. Wentworth
By his Attorney,
Nelson W. Howard

UNITED STATES PATENT OFFICE.

PEARL JOSEPH WENTWORTH, OF FORT THOMAS, KENTUCKY, ASSIGNOR, BY MESNE ASSIGNMENTS, TO UNITED SHOE MACHINERY CORPORATION, OF PATERSON, NEW JERSEY, A CORPORATION OF NEW JERSEY.

MOLDING-MACHINE.

1,288,776.

Specification of Letters Patent.  Patented Dec. 24, 1918.

Application filed April 24, 1917. Serial No. 164,141.

*To all whom it may concern:*

Be it known that I, PEARL J. WENTWORTH, a citizen of the United States, residing at Fort Thomas, in the county of Campbell and State of Kentucky, have invented certain Improvements in Molding-Machines, of which the following description, in connection with the accompanying drawings, is a specification, like reference characters on the drawings indicating like parts in the several figures.

This invention relates to machines for molding or shaping blanks and is illustrated in connection with a machine for performing a preliminary shaping operation on a toe tip to prepare it for the lasting operation.

It is customary in the manufacture of boots and shoes to mold or shape certain parts such as toe tips, counters and box toes preparatory to assembling these parts in the uppers; and the general object of the present invention is to provide improved means for performing this and similar operations.

One feature of the invention comprises a machine of the class described having a rigid chute, a former for forcing a blank through the chute and thereby imparting to it a shape determined by the contour of a cross-section of the chute, and means for subjecting the blank to heat during its passage. With this construction the blank is maintained unyieldingly in its bent condition during its passage through the chute and is subjected for a considerable interval to the action of heat whereby it becomes more permanently set in the shape imparted to it than would otherwise be the case; and after the shaping operation it is ejected from the end of the chute opposite to that at which it was forced in.

This and other features of the invention including certain details of construction and combinations of parts will be described in connection with an illustrative machine and pointed out in the appended claims.

Referring now to the accompanying drawings.

In the illustrative machine the toe tip or other piece to be shaped or molded is placed on the flat top of a heated chute of segmental shape, a presser then descends upon the piece to clamp it with the desired force to the top of the chute, after which a heated former descends upon the unsupported middle portion of the piece, forces it into the chute against the drag or resistance afforded by the clamping action of the presser, and finally draws the piece through the chute and ejects it in its molded form. With this brief description of the mode of operation of the machine, the details of its construction will now be explained.

Figure 1:
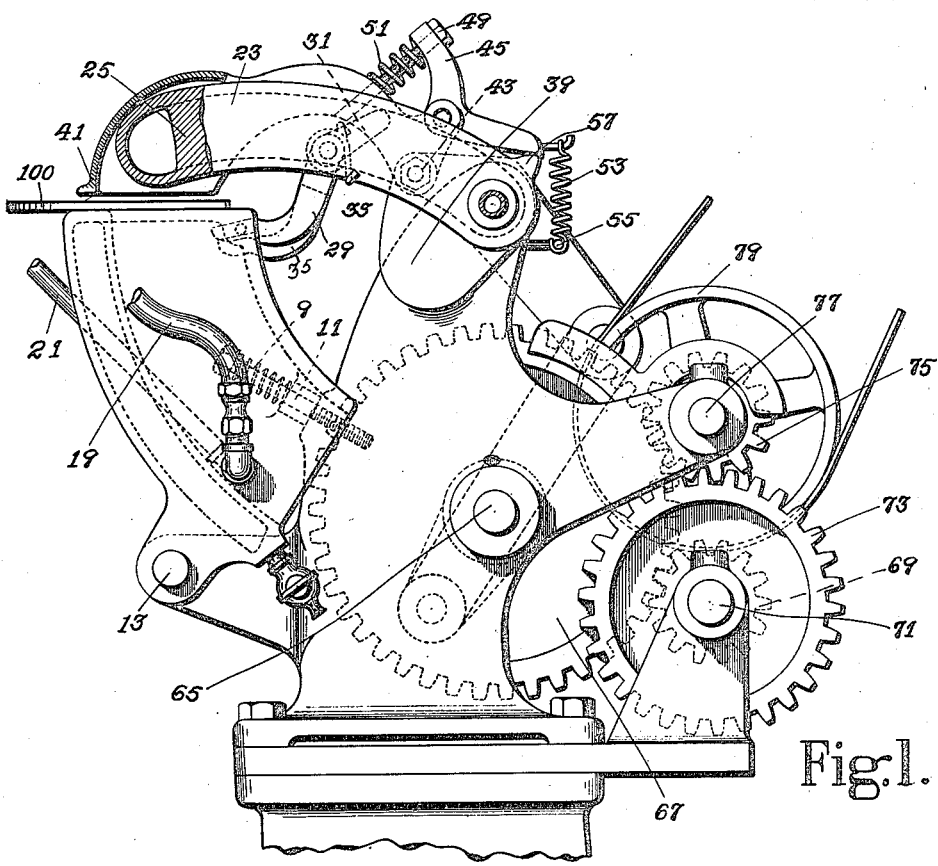
Figure 1 is an elevation of a machine in which the present invention is embodied.

Pivoted to the frame 5 of the machine is a chute 7 normally held in the position shown in Fig. 1 by a spring 9 coiled about the stem of a headed bolt 11 which is threaded into the frame of the machine, said spring bearing at its upper end against the head of the bolt and at its lower end against a lug which is part of the chute 7. The chute is thus held in the angular position shown in Fig. 1 but may yield in a counter clockwise direction about the pivot 13 for a reason which will presently appear. The chute is of general segmental shape being approximately concentric with the axis of the hollow shaft 15; it is U-shaped in cross-section and is provided with a steam chamber 17 having inlet and outlet pipes 19 and 21.

Figure 2:
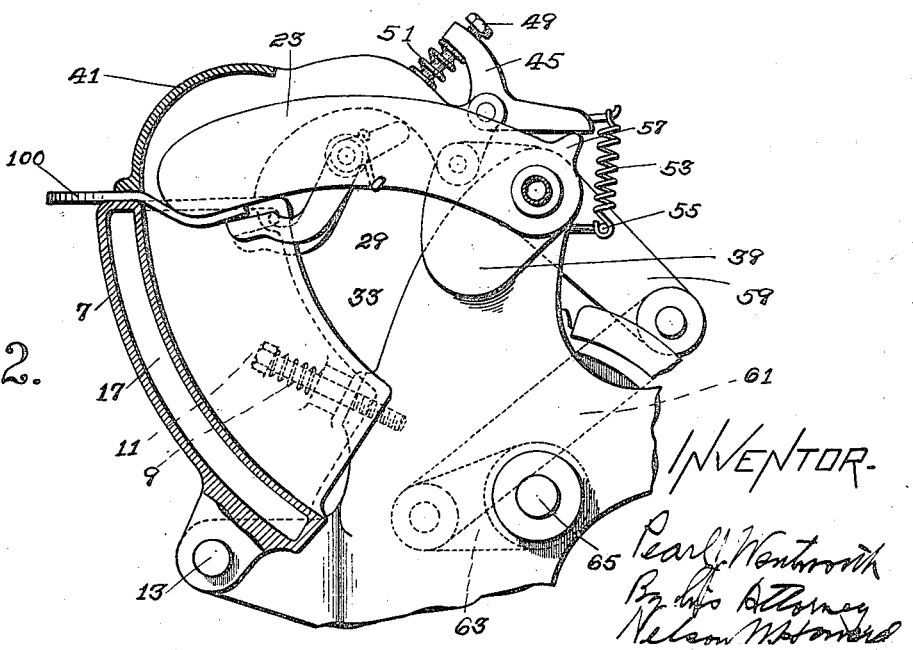
Fig. 2 is a detail elevation, partly in section, showing the starting of the molding operation.
Figure 3:
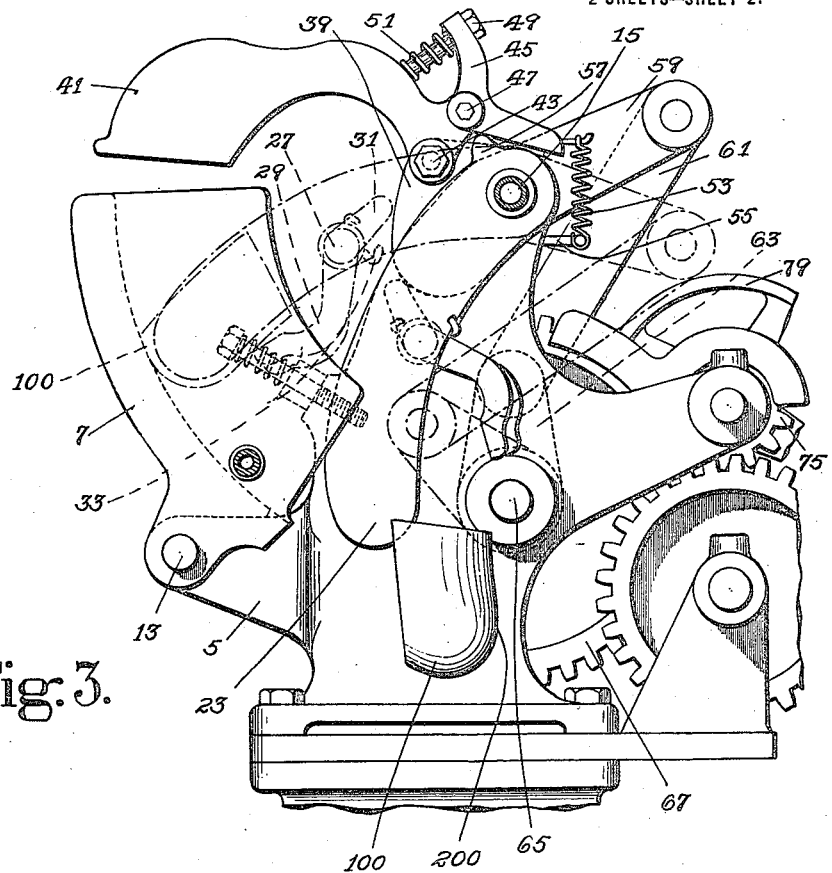
Fig. 3 is an elevation showing the molded counter as it is being ejected.
Figure 4:
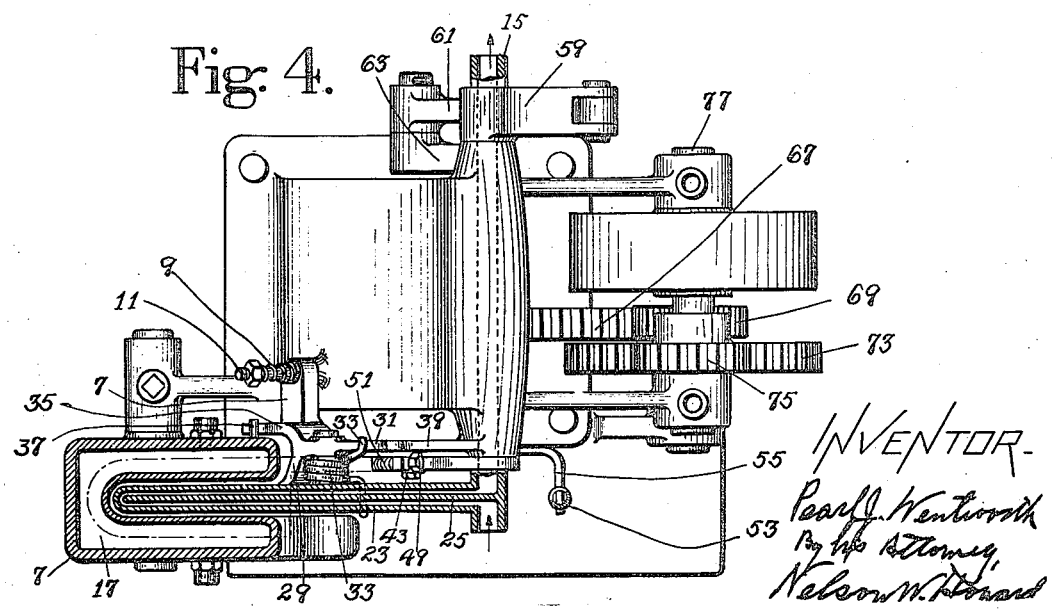
Fig. 4 is a plan, partly in cross-section.

The former 23 is fast to the end of a hollow rock shaft 15 and comprises a hollow member of the curved shape shown having a centrally located baffle plate 25 around which the steam flows as indicated by the arrows in Fig. 4. Pivoted to the former 23 at 27 is a gripper 29 having a tail 31; and a spring 33 coiled about the pivot 27 and having one end bent over the tail 31 and the other bent under the former 23 tends to hold the left-hand end of the gripper against the under side of the former, and thereby to grip the toe tip or other piece firmly during certain positions of the movable former. When the former is in the position indicated in Fig. 1, the gripper should be held spaced from the former so as to permit presentation to the machine of the toe tip, and this spaced relation is brought about by contact of a finger 35 which is integral with the gripper 29 with a pin 37 which is carried by a wall of the chute 7. Thus, as soon as the former 23 has been moved downwardly a short distance, as indicated in Fig. 2, the gripper seizes the margin of the piece of leather by pressing it against the former and causes it to be carried down by the downward movement of the former until said gripper is released by contact of its tail 31 with a stationary cam 39 as indicated in Fig. 3.

In order to press the toe tip against the flat horseshoe-shaped upper face or work support of the chute 7 there is provided a presser 41 which is pivoted to the stationary cam 39 at 43. A bell-crank lever 45 pivoted to the presser at 47 is connected with the presser 41 through its upper arm by a bolt 49 and spring 51 said bolt passing freely through a bore in said upper arm and being threaded into said presser. A second spring 53 connected at its upper end to the outer end of the lower arm of the bell-crank lever 45 and at its lower end to a small stationary bracket 55 holds said lower arm at all times against a small cam 57 which is integral with the former 23. By this construction the presser 41 is normally held in the raised position indicated in Fig. 1 so that the toe tip may be presented to the machine but descends upon the tip, as indicated in Fig. 2, as soon as the former 23 has moved downwardly a short distance.

Fast to one end of the rock shaft 15 is an arm 59 which is connected by a link 61 with a crank arm 63 fast on one end of a rotary counter shaft 65. This counter shaft carries a large gear 67 which meshes with a pinion 69 on a short shaft 71, said short shaft also carrying a gear 73 which meshes with a pinion 75 on the drive shaft 77, a pulley 79 fast to the drive shaft furnishing means for connecting the machine to a suitable source of power.

The operation of the machine is as follows: When the parts of the machine are in the positions indicated in Fig. 1, a toe tip blank 100 is presented to the machine as indicated in said figure by placing it upon the flat horseshoe-shaped top of the chute 7 beneath the presser 41 and the former 23. As the former moves downwardly the blank is seized by the gripper 29 at a point on one edge of said blank; and the presser 41, by the action of the cam 57 through the spring 51, causes the presser to press the blank yieldingly against the top of the chute and to maintain this yielding pressure while the blank is drawn slowly down into the chute. When the tail 31 of the gripper rides over the stationary cam 39, said gripper is moved away from the former 23 to release the blank from its gripping action. The former continues to move downwardly dragging the blank through the chute and, after ejecting it, returns to the position of Fig. 1 whereupon a second blank may be presented to the machine. The purpose of the spring 9 is to permit the chute 7 to move angularly in case such movement is necessary by reason of the thickness of the blank. The effect of forcing the blank through the heated chute by the heated former against the resistance offered by the action of the presser 41 in the manner described is to stretch it more or less as may be desired, and at the same time to mold the whole blank into a shape approximating that which it is to assume in the finished shoe.

Although the particular machine which has been shown is adapted for use in molding toe tips, it should be understood that the invention is not limited in the scope of its application to the particular machine which has been shown and described nor to a machine for operating upon any particular part of a boot or shoe.

Having thus described my invention, what I claim as new and desire to secure by Letters Patent of the United States is:

1. A machine for shaping a blank, having, in combination, a rigid chute, a former for forcing the blank through the chute thereby imparting to it a shape determined by the contour of a cross-section of the chute, and means for subjecting the blank to heat during its passage to give permanence to the shape imparted to it.

2. A machine for shaping a blank, having, in combination, a rigid chute, a former for forcing the blank through the chute and thereby imparting to it a shape determined by the contour of a cross-section of the chute, means for subjecting the blank to heat during its passage to give permanence to the shape imparted to it, and means for exerting a drag upon the blank in opposition to the movement caused by the former.

3. A machine for shaping a blank, having, in combination, a rigid chute U-shaped in cross-section, a former for forcing the blank through the chute, and means for heating the chute and former.

4. A machine for shaping a blank, having, in combination, a rigid chute, a former for forcing the blank through the chute, means for heating the chute and former, and means for exerting a drag upon the blank in opposition to the movement caused by the former.

5. A machine for shaping a blank having, in combination, a chute substantially U-shaped in cross-section and provided with a flat end to receive a flat blank, a former for forcing the blank through the chute and thereby imparting to it a shape determined by the contour of a cross-section of the chute, and means for subjecting the blank to heat during its passage to give permanence to the shape imparted to it.

6. A machine for shaping a blank having, in combination, a chute substantially U-shaped in cross-section and provided with a flat end to receive a flat blank, means engaging the blank to press it yieldingly against the end of the chute, and a former for forcing the blank through the chute in opposition to drag upon the blank by the yielding presser.

7. A machine for shaping a blank having, in combination, a hollow chute substantially U-shaped in cross-section, a correspondingly shaped hollow former for forcing the blank through the chute, and means for introducing a hot fluid into said hollow members.

8. A machine for shaping a blank, having, in combination, a rigid chute substantially U-shaped in cross-section, a former for forcing the blank through the chute, means for gripping the blank to and releasing it from the former, and means for exerting a drag upon the blank in opposition to the movement caused by the former.

9. A machine for shaping a blank, having, in combination, a rigid chute substantially U-shaped in cross-section, a former for forcing the blank through the chute, and a spring constructed and arranged to permit relative separating movement of said chute and former.

10. A machine for shaping a blank, having, in combination, a chute having a support for a blank, means for yieldingly pressing a portion of the margin of the blank upon the support, and means for pressing upon the middle portion of the blank to force it through the chute against the opposition of the pressing means.

11. A machine for shaping a blank having, in combination, a pivoted chute of segmental outline, a former for forcing the blank through the chute, and a spring arranged to permit the chute to yield angularly away from the former.

12. A machine for shaping a blank, having, in combination, a shaft, a segmental chute concentric with the axis of said shaft, said chute being substantially U-shaped in cross-section, a former fast to said shaft and arranged to pass through said chute, a presser located above said chute and former, a gripper for compelling the blank to travel with the former, and means actuated by the movement of the former for operating said presser and gripper.

In testimony whereof I have signed my name to this specification.

PEARL JOSEPH WENTWORTH.